United States Patent [19]

Jeffcoat et al.

[11] Patent Number: 5,405,190
[45] Date of Patent: Apr. 11, 1995

[54] COVER FOR VEHICLE HEAD RESTRAINT

[75] Inventors: Keith Jeffcoat, Nuneaton; Rodger G. Smith, Ludlow, both of United Kingdom

[73] Assignee: General Motors Corporation, Detroit, Mich.

[21] Appl. No.: 5,892

[22] Filed: Jan. 15, 1993

[30] Foreign Application Priority Data

Jan. 16, 1992 [GB] United Kingdom ............... 9200938

[51] Int. Cl.⁶ .................................................. A47C 7/36
[52] U.S. Cl. .............................. 297/391; 297/DIG. 1
[58] Field of Search .......... 297/391, DIG. 1, DIG. 2, 297/397, 396, 410

[56] References Cited

U.S. PATENT DOCUMENTS 4,738,809  4/1988  Storch ........................... 297/410 X
5,165,754  11/1992  Louys .......................... 297/DIG. 2 X

FOREIGN PATENT DOCUMENTS 341683   11/1989  European Pat. Off. .
2577869  8/1986   France .
2715027  10/1977  Germany ................. 297/DIG. 1 X
3736828  5/1989   Germany .
4105439  8/1992   Germany .
0054761  5/1977   Japan ....................... 297/DIG. 1 X
0042297  12/1979  Japan ....................... 297/DIG. 1 X
2164248  3/1986   United Kingdom .

*Primary Examiner*—Kenneth J. Dorner
*Assistant Examiner*—Milton Nelson, Jr.
*Attorney, Agent, or Firm*—Davis Hoxie Faithfull & Hapgood

[57] ABSTRACT

A vehicle seat head restraint has a framework stiffened resilient core and a fabric covering formed from at least one three-dimensional knitted fabric piece secured around the core.

4 Claims, 3 Drawing Sheets

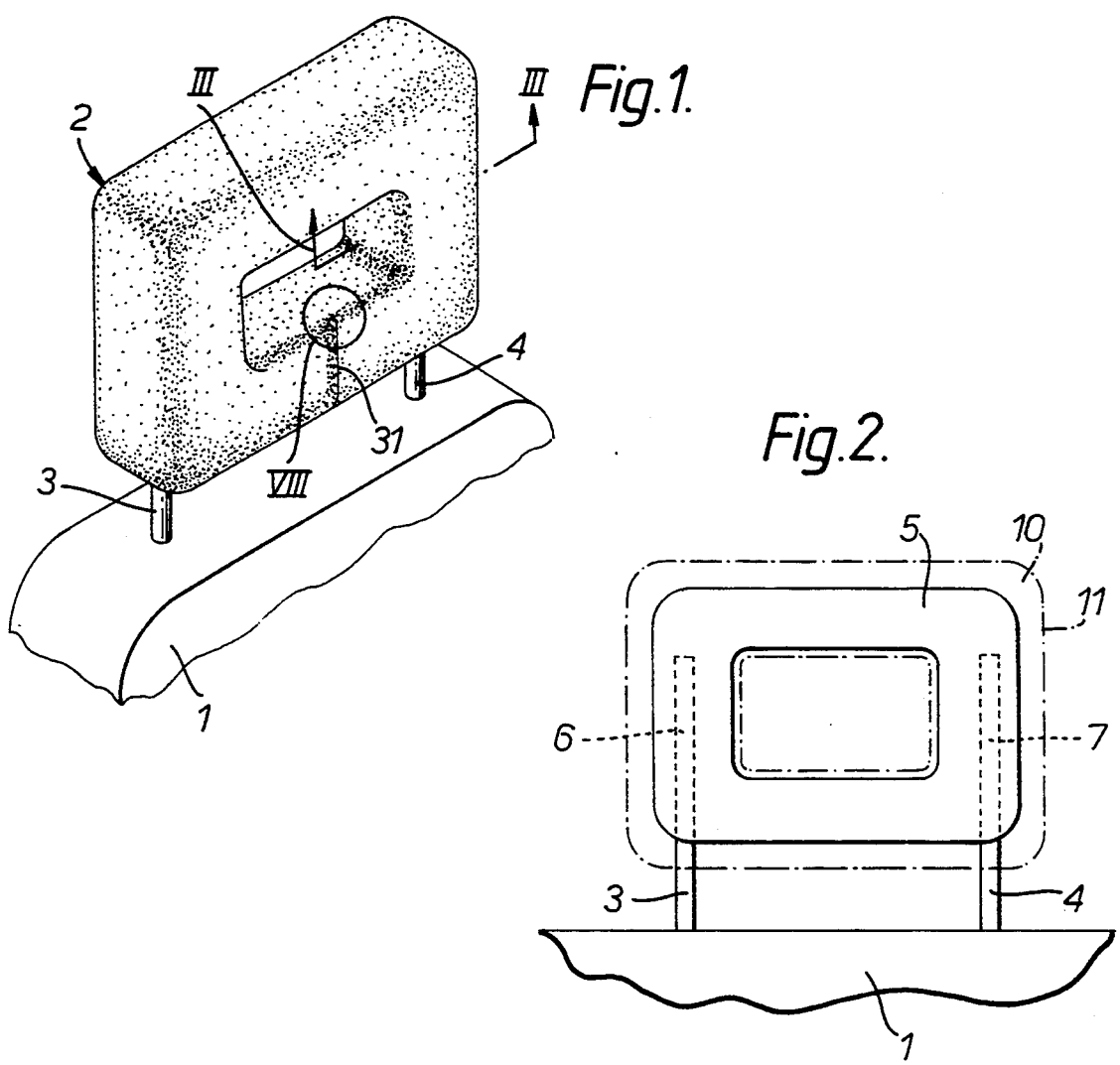
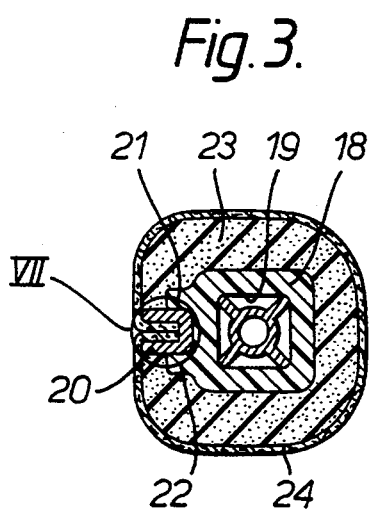

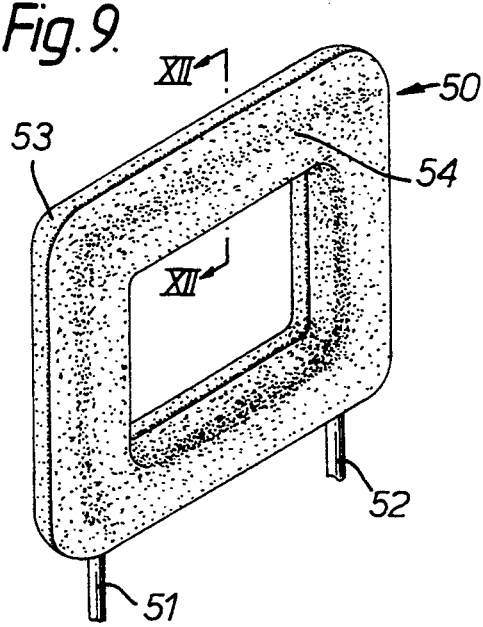
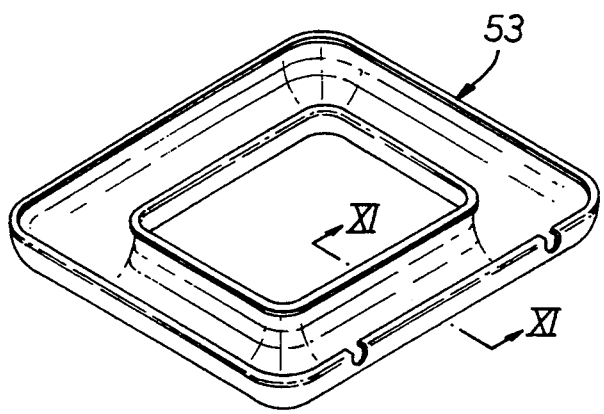
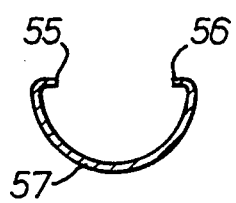
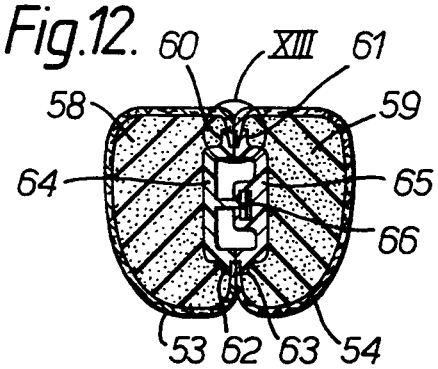
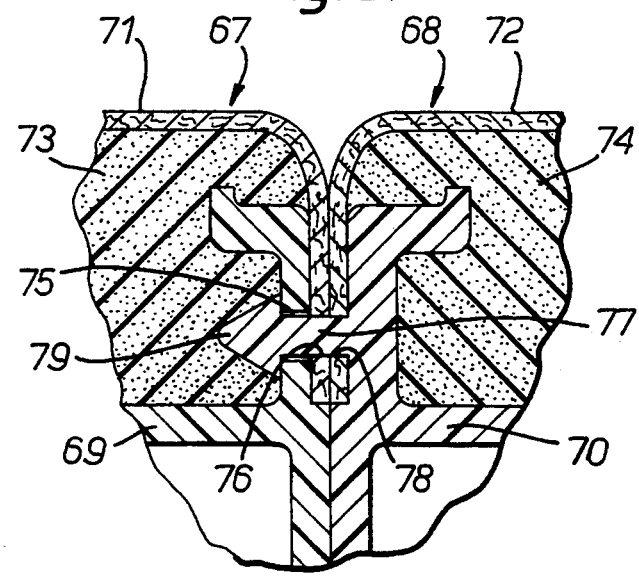

COVER FOR VEHICLE HEAD RESTRAINT

FIELD OF THE INVENTION

This invention relates to head restraints and has particular, but not necessarily exclusive, reference to head restraints for use on vehicles seats.

DISCUSSION OF PRIOR ART

Head restraints are increasingly becoming a standard fitment to vehicles to reduce the dangers to an occupant of so-called whiplash injuries. Head restraints may be formed integrally with the seat or may be formed as a separate component mounted in such a way as to be adjustable on the seat.

The present invention is concerned with a head restraint particularly suitable for mounting on a pillar or pair of pillars for vertical adjustment on a seat.

SUMMARY OF THE INVENTION

By the present invention there is provided a head restraint for a vehicle seat, the head restraint being of generally annular shape and including an annular framework, there being resilient foam covering over part at least of the framework, and a fabric cover covering over the resilient foam, wherein the cover is of three dimensional knitted construction, the cover being tautly wrapped around the framework and foam covering, and the free edges of the cover being secured in close relationship to leave the cover encompassing the framework and foam covering.

The fabric cover may be in the form of a waisted tube in the unassembled condition of the head restraint. The waisted tube may be integrally knitted in a single jersey construction on a knitting machine having two opposed needle beds. The cover may alternatively be of a double jersey construction and may be knitted as a double jersey seamless tube on a four bed knitting machine, or may be formed on a two bed knitting machine and be provided with a seam. The seam may be sewn together.

The free edges of the fabric cover may be secured in abutting face-to-face relationship. They may be secured in an outwardly directed groove. The edges may be tubular and may contain a cord. The cord may be elasticated. The edges may have an integrally knitted elasticated portion.

The free edges of the fabric cover may be clamped between two halves of the framework.

The fabric cover may be in the form of a pair of double jersey three dimensionally knitted open rectangles of generally gutter shape in cross-section. The open rectangles may be seamed together around the inside or the outside. Alternatively the knitted rectangles may be clamped together between two parts of the framework.

The foam covering may be preformed and the cover may be wrapped around the foam. Alternatively, or additionally, the cover may be located over the framework and the foam may be formed in situ between the cover and the framework.

The cover is preferably a weft knitted double jersey fabric knitted with an air-textured continuous filament synthetic yarn on a knitting machine having a gauge of 10 to 14. (A gauge of 10 to 14 means that there are 10 to 14 needles per inch (2.54 cms)). The fabric preferably has, in the relaxed state, from 4 to 6 wales per cm and from 10.5 to 22 courses per cm. The yarn used preferably has a count of 550 to 850 decitex, particularly 650 to 800 decitex and is preferably an air textured polyester yarn.

The fabric may be knitted in accordance with the method described in GB-A-2,223,035, the contents of which are incorporated herein by way of reference.

BRIEF DESCRIPTION OF THE DRAWINGS

By way of example embodiments of the present invention will now be described with reference to the accompanying drawings, of which:

FIG. 1 is a perspective view of a head restraint located on a seat,

FIG. 2 is a schematic face view of the head restraint of FIG. 1,

FIG. 3 is a partial section of FIG. 1 along the line III—III,

FIG. 9 illustrates a schematic perspective view of a second embodiment of head restraint, FIG. 10 illustrates a fabric cover half for the head restraint of FIG. 9, FIG. 11 is a sectional view of FIG. 10 along the line XI—XI, FIG. 12 is a cross sectional view of FIG. 9 along the line of XII—XII, and FIG. 13 is an enlarged view of a connection between two half annuli similar to that incorporated within the circle XIII of FIG. 12.

DESCRIPTION OF PREFERRED EMBODIMENTS

Figure 4:
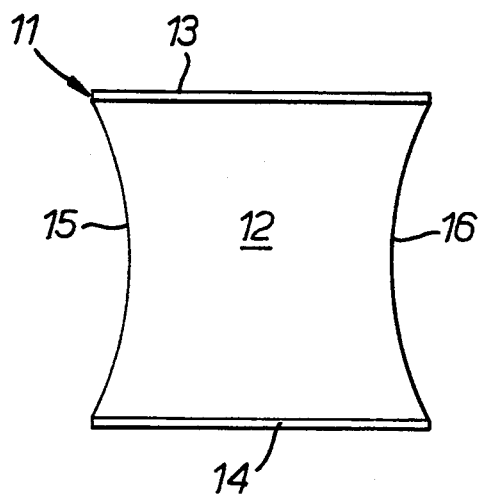
FIG. 4 is a plan view of a knitted cover prior to seaming.

In FIG. 1 it can be seen that a seat 1 is provided with a head restraint generally indicated by 2. The head restraint is mounted on a pair of rods or pillars 3,4. The head restraint 2 is of generally annular shape. Such a shape is sometimes referred to as a doughnut shape. The pillars 3,4 are aligned with upright portions of the head restraint as may be seen more easily in FIG. 2.

The important components of the head restraint 2 effectively comprise a framework 5 of generally annular shape having a pair of recesses 6,7 to receive the rods or pillars 3,4 (e.g. of metal) which support the head restraint. Surrounding the framework 5—which is typically of rigid plastics material such as polypropylene—is a foam covering 10 which provides resilience to the head restraint. On the outside of the foam covering 10 is a fabric cover 11.

Figure 5:
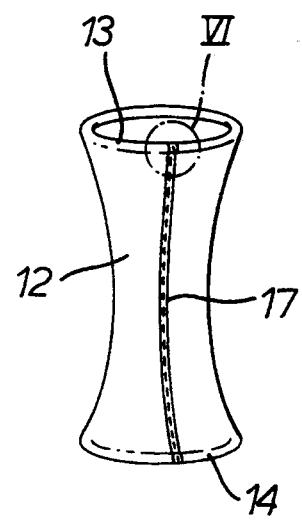
FIG. 5 is a perspective view of the cover of FIG. 4 seamed.
Figure 6:
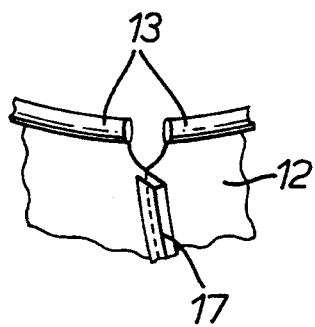
FIG. 6 is an enlarged view of the part of FIG. 5 within the circle VI.

The fabric cover of one embodiment of the invention is shown in more detail in FIGS. 4 to 6. The fabric cover of this embodiment is a three dimensionally knitted structure 12 having a generally waisted rectangular shape as shown in FIG. 4. The structure 12 is provided at each of its ends 13,14 with an integral tubular portion. The cover 11 is knitted on a flat V-bed knitting machine in a double jersey structure using an air textured polyester continuous filament yarn of 750 decitex. The double jersey construction of the main portion of the cover is formed by interlinking the jersey structures of the two faces.

The tubular portions 13 and 14 are produced by separating the two faces to produce a double layer single jersey structure. By rejoining the faces on the knitting machine a tubular portion can be produced. The method of manufacturing such tubular hems is described in the specification of GB-A-2,223,034, the contents of which are incorporated herein by way of reference.

The cover 11 shown in FIG. 4 is not produced in a completely flat manner. It is so produced that on folding to the structure shown in FIG. 5 a waisted tubular structure is produced. The edges 15,16 of the cover 11 are joined together by a seam, as at 17, so as to produce the generally waisted tubular member shown. The outside of the tube, as shown in FIG. 5, is the reverse of the fabric and the inside of the tube exhibits the face of the fabric which is exposed and thus on view in the assembled head restraint 2.

As can be seen more clearly in FIG. 6, the seam 17 terminates close to the end of the tubular member showing the tubular hem 13. It will be appreciated that in FIG. 6 both ends of the tubular hem 13 can be seen. An elastic cord is then inserted into the tubular hem 13. If required the cord can be inserted before the seam 17 is formed.

One tubular end is then pushed through the central aperture in a preprepared annular foam covered framework and the tubular cover is folded outwardly so that the hems 13 and 14 lie around the outer periphery of the foam covered framework.

As can be seen clearly in FIG. 3, the framework 18 has a recess 19 for accommodating the support rod 4. The framework also incorporates a U-shaped channel member 20 extending around substantially the whole of the periphery of the framework held by legs 21, 22 on the body of the framework. Surrounding the framework 18 is a foam covering 23. To secure the head restraint cover 24 in position, the edges of the cover are pushed into the groove in the U-shaped member 20. This is shown in more detail in FIG. 7.

Figure 7:
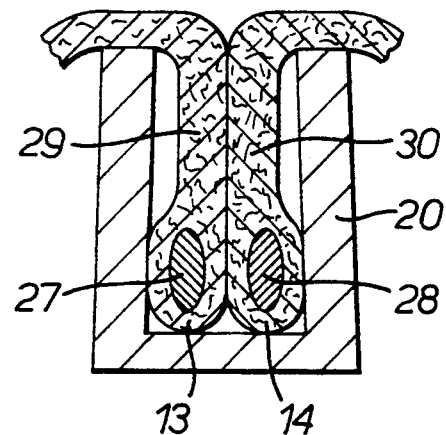
FIG. 7 is an enlarged view of the part of FIG. 3 within the circle VII.
Figure 8:
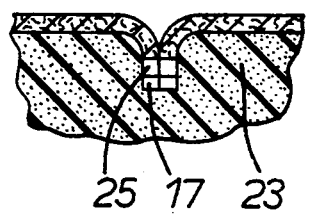
FIG. 8 is an enlarged view of the part of FIG. 1 within the circle VIII.

As can be seen in FIG. 7 the U-shaped member 20 receives the two tubular hems 13, 14 in which there are located elastic cords 27,28. By tightening the elastic cords 27,28 the edges of the tubular hems 13, 14 are pulled tight in the U-shaped member 20 pulling edge regions 29,30 of the cover into the groove. Thus by a single operation the entire cover can be held in position to complete the annular head restraint. The seam 17 is so arranged as to lie at the lowermost point 31 of the head restraint. As can be seen in FIG. 8 the seam 17 cuts into the foam covering 23. The seam may be double locked as shown at 25 in FIG. 8.

If required, one or both edges of the cover 11 can be formed with recesses to accomodate the support pillars for the head restraint. Alternatively, the cover may be formed with integral apertures to permit the head restraint support pillars to pass through the cover prior to assembly of the cover.

FIGS. 9 to 13 illustrate a second, alternative, embodiment of the invention. FIG. 9 shows a head restraint 50 of generally annular shape again located on support rods or pillars 51,52. The head restraint 50 again comprises an annular framework encompassed by a foam covering and having an outer fabric cover. In this case, however, the three dimensional knitted double jersey fabric cover is formed in two halves 53 and 54. Each half is of a generally open rectangular shape and in cross section is of generally gutter shape. One half 53 is shown in more detail in FIGS. 10 and 11. As can be seen from FIG. 10, the half 53 has a curved rectangular shape in plan and, as may clearly be seen in FIG. 11 (which is a section of FIG. 10 along the line XI—XI), is of generally U-shape in cross-section. The structure of FIG. 10 may be knitted in a double jersey construction on a flat V-bed knitting machine. Preferably the upper edges 55,56 of the gutter shape 57 are inwardly directed.

As can be seen in FIG. 12 the two open rectangular covers 53, 54 encompass two foam cores 58,59. FIG. 12, which is a section of FIG. 9 through the line XII—XII shows the peripheral edges of the two half fabric covers trapped between extensions 60,61,62,63 of framework members 64 and 65. As is illustrated in FIG. 12 the two framework members 64 and 65 each constitute roughly half of the framework and may be snap-locked together as at 66.

The arrangement illustrated in FIG. 13 shows in more detail how a head restraint can be produced by the snapping together of two half doughnuts so that the action of snapping together the two halves forms the complete doughnut and also retains the fabric cover in position. It will be appreciated that FIG. 13 illustrates in detail the connection between the two portions of the half head restraints illustrated generally within the circle XIII of FIG. 12.

Thus each half doughnut can be prepared with a framework member 69,70 and a fabric cover 71,72 stretched over an internal foam covering 73, 74 for the framework. As can be seen, the framework 69 has an aperture 75 which coincides with an aperture 76 in the fabric cover 67. The framework 70 is provided with a spigot 77 which extends through an aperture 78 in the fabric cover 72, through the aperture 76 and through the aperture 75. An enlarged head 79 on the spigot 77 locks into the framework 69 to retain the two halves together. It will be appreciated that a number of spigots and holes would be provided around the periphery of the framework to hold the two half sections together. It will also be appreciated that further smaller spigots may be produced on each of the framework halves to retain the fabric cover in position prior to assembly of the whole head restraint 50.

It will further be appreciated that the fabric cover can be loosely located on the framework and the foam coverings 73,74 may be produced inside this by foaming in situ.

Described above are double jersey upholstered structures in which the fabric is produced either as a two-part construction, as illustrated in FIGS. 9 to 13, or as a single, seamed construction as is illustrated in FIGS. 1 to 8. When knitting a double jersey fabric on a knitting machine having two opposed needle beds it is either possible to knit a tubular single jersey structure including a waisted single jersey tube or a double jersey structure can be produced which requires either seaming or assembly in two parts. For upholstery fabric subject to wear, double jersey material is required for reasons of resistance to abrasion and strength. Head restraints, however, have much less abrasive conditions to encounter and it is feasible that single jersey structures could be used for such seat components.

It is also possible to produce a double jersey seamless tube by the use of a four bed knitting machine, although four bed knitting machines are not yet readily available in commercial production. The invention does, however, envisage that when such machines become commercially available they may be used to knit double jersey seamless tubes suitable for the production of head restraints in accordance with the present invention.

It will also be appreciated that rather than preforming the foam covering to the framework it is possible to assemble the cover to a suitable framework and then to inject into the space between the cover and the framework a material which forms a resilient foam in situ.

It will be appreciated that the present invention provides a head restraint having on its exterior face far fewer seams than prior art head restraints and the head restraint can therefore have a close fitting smooth cover. Compared to prior art woven and sewn head restraint covers, the head restraint with the three dimensionally knitted upholstery cover is much smoother, closer fitting, and is easier to assemble.

What is claimed is:

1. In a head restraint for a vehicle seat of generally annular configuration having an annular framework with a resilient foam cushion over at least part of the framework, the improvement which comprises a cover for said framework and cushion, said cover comprising a three-dimensional knitted fabric conforming to the shape of the cushion having first and second free edges, said fabric being taughtly wrapped around the framework and cushion, and a U-shaped member securing said free edges with the first free edge in close relationship with the second free edge.

2. A head restraint as claimed in claim 1, wherein said first and second free edges are secured in abutting face-to-face relationship.

3. A head restraint as claimed in claim 1, wherein the fabric cover is a waisted tube, said free edges constituting opposite ends of the waisted tube.

4. A head restraint as claimed in claim 3, wherein said first and second free edges are secured in abutting face-to-face relationship.

* * * * *